United States Patent

Schmidt et al.

[11] Patent Number: 5,936,723
[45] Date of Patent: Aug. 10, 1999

[54] ORIENTATION DEPENDENT REFLECTOR

[75] Inventors: Karl B. Schmidt, Sarasota, Fla.; Brian S.R. Armstrong, Shorewood, Wis.

[73] Assignee: Go Golf, Sarasota, Fla.

[21] Appl. No.: 08/698,115

[22] Filed: Aug. 15, 1996

[51] Int. Cl.⁶ .................................................. G01B 11/26
[52] U.S. Cl. .................................. 356/152.3; 356/139.03
[58] Field of Search .......................... 356/139.03, 152.2, 356/152.3

[56] References Cited

U.S. PATENT DOCUMENTS

| | | | |
|---|---|---|---|
| 3,915,575 | 10/1975 | Sick | 356/152.2 |
| 4,227,807 | 10/1980 | Pond et al. | 356/139.03 |
| 4,583,852 | 4/1986 | Cassidy et al. | 356/152.2 |
| 4,732,472 | 3/1988 | Konig et al. | 356/152.3 |

FOREIGN PATENT DOCUMENTS

| | | | |
|---|---|---|---|
| 405118868 | 5/1993 | Japan | 356/139.03 |
| 800628 | 1/1981 | U.S.S.R. | 356/152.3 |

OTHER PUBLICATIONS

Pending U.S. Patent Application, Serial No. 08/698,357, filed Aug. 15, 1996, Brian S. R. Armstrong and Karl B. Schmidt, "Apparatus and Method for Determining the Angular Orientation of an Object".

*Primary Examiner*—Stephen C. Buczinski
*Attorney, Agent, or Firm*—Wolf, Greenfield & Sacks, P.C.

[57] ABSTRACT

An orientation dependent reflector for reflecting light from a light source to facilitate the determination of the angular orientation of an object, the reflector comprising a transparent substrate having front and back surfaces, a plurality of retro reflecting patches coupled to the back surface, and an opaque film layer coupled to the front surface having a plurality of openings therein to facilitate passing light through the transparent substrate to reflect off of the retro reflecting patches in correspondence to angular orientation such that the angular orientation of the object is determined from the centroid of reflection.

40 Claims, 5 Drawing Sheets

ORIENTATION DEPENDENT REFLECTOR

BACKGROUND OF THE INVENTION

1. Field of the Invention

This invention relates to a reflector and, more particularly, to an orientation dependent reflector for use in reflecting light to facilitate the determination of angular orientation of an object.

2. Description of the Background Art

Presently, many types of reflectors are available and in use today throughout the industry. However, many of the prior art reflectors do not provide for the sensing of the orientation of an object in multiple dimensions. The majority of the prior art reflectors used to serve the measuring of orientation are limited to facilitating measurement in a single dimension. Of those prior art reflectors used today in the industry for determining orientation in more than one dimension, a light detector that utilizes two-dimensional image processing or a group of sensors arranged in a line or over an area is required. Light detectors capable of two-dimensional image processing are quite expensive and not practical for all commercial applications.

Most importantly, the prior art reflectors available today in the industry lack the ability to gather light in adequate amounts so to facilitate being instantaneously detected from a remote position. Due to the prior art reflectors having an inherent inadequate ability to gather light, many of the prior art reflectors used for orientation purposes are resultingly large in size rendering them bulky and cumbersome to attach and utilize. Representative of various prior art reflectors used in orientation determination can be seen as utilized in U.S. Pat. Nos. 3,194,563; 3,697,183; 4,155,555; 4,251,077 and 4,341,384, the disclosures of which are hereby incorporated by reference herein.

While the reflectors disclosed in the abovereferenced prior art patents, used for orientation purposes, serve to provide reflections of light in varying forms for detecting orientation, it can be seen that many require light detectors capable of two-dimensional image processing or, alternatively, require a group of sensors arranged in a line or over an area. Many of the reflectors are large in construction rendering them bulky and cumbersome to use, many are incapable of gathering adequate amounts of light to facilitate a light detector determining the centroid of reflection on the reflector, and many are expensive and complex to manufacture.

Other, less relevant, forms of reflectors can be seen as used in systems for measuring an aspect of movement of an object in U.S. Pat. Nos. 3,895,366; 4,136,387; 4,137,566; 4,146,230; 4,254,956; 4,304,406; 4,488,173; 4,583,862; 4,910,410; 5,187,540; 5,257,084; 5,319,577; 5,353,358; and 5,453,686, the disclosures of which are hereby incorporated by reference herein.

Of the prior art reflectors utilized in the above-referenced disclosures, the most relevant is disclosed in U.S. Pat. No. 3,697,183, issued to Knight. The Knight patent discloses the use of two gratings for which light passes through to a specular reflector whereupon reflection is produced. However, the specular reflector utilized in Knight still exhibits the inadequate capability of gathering adequate amounts of light for being detected from a remote position. Further, due to the light gathering properties of the reflector utilized in Knight, only measurements of small and relatively slow changes in orientation are provided for. Further, Knight requires a group of sensors arranged in a line to accomplish the detection.

SUMMARY OF THE INVENTION

Accordingly, due to the inadequacies of the prior art reflectors as utilized in the disclosures referenced above, it was realized that an improved reflector for orientation sensing should be provided for overcoming the inadequacies existing in the industry today.

Therefore, it is an object of this invention to provide an improvement which overcomes the aforementioned inadequacies of the prior art devices and provides an improvement which is a significant contribution to the advancement of the orientation related reflector art.

Another object of this invention is to provide an orientation dependent reflector that is capable of facilitating the determination of the angular orientation of an object in at least one-dimension.

Another object of this invention is to provide an orientation dependent reflector that can be utilized with a light detector capable of detection in only one dimension.

Another object of this invention is to provide an orientation dependent reflector that, when used in combination with additional orientation dependent reflectors of like kind, can facilitate the determination of angular orientation in three dimensions.

Another object of this invention is to provide an orientation dependent reflector that has the ability to gather adequate amounts of light so to facilitate the centroid of reflection thereon being detected by a light sensor located at a remote position.

Another object of this invention is to provide an orientation dependent reflector that utilizes retro reflecting material for producing highly intensive light reflections.

Another object of this invention is to provide an orientation dependent reflector that is compact and lightweight in construction thereby facilitating ease of attachment to a wide range of objects of varying sizes.

Another object of this invention is to provide an orientation dependent reflector that is inexpensive and simple to manufacture thereby readily facilitating the commercialization thereof.

Another object of this invention is to provide an orientation dependent reflector for determining the angular orientation of an object, the orientation dependent reflector comprising in combination: a transparent substrate having a front surface and a back surface, the transparent substrate capable of being coupled to the object; a retro reflection means coupled to the back surface for reflecting light back towards the light source parallel to the direction of arrival of the light; and an opaque means coupled to the front surface for preventing light from passing through the transparent substrate, the opaque means further including a plurality of openings aligned in a laterally-spaced offset nature relative to the retro reflection means, whereby the plurality of openings facilitates the passing of light through the transparent substrate to reflect off the retro reflection means so to facilitate obtaining a reflection of varying position in correspondence to the angular orientation of the object.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the detailed description of the preferred embodiment in addition to the scope of the invention defined by the claims taken in conjunction with the accompanying drawings.

The invention is defined by the appended claims with the specific embodiment shown in the attached drawings. For the purpose of summarizing the invention, the invention comprises an orientation dependent reflector formed from a transparent substrate having a front and back surface, a plurality of retro reflecting patches positioned on the back surface, and an opaque film layer having a plurality of openings therein positioned on the front surface such that light passes through the plurality of openings and the transparent substrate so to reflect off of the plurality of retro reflecting patches.

The use of retro reflecting patches formed from retro reflecting material in the present invention provides the orientation dependent reflector with the ability to gather and reflect light in adequate amounts necessary for detection from remote positions. Further, the ability to gather and reflect light in adequate amounts allows for the physical dimension of the orientation dependent reflector of the present invention to be constructed in much smaller sizes than currently available in the industry today.

The plurality of openings in the opaque film layer are positioned such that they are aligned in a laterally-spaced offset nature relative to the plurality of retro reflecting patches. This facilitates allowing only certain individual retro reflecting patches to be exposed to the light source such that a centroid of reflection is detected that varies in correspondence to the angular orientation of the object. In one embodiment, the plurality of retro reflecting patches are parallel aligned, rectangular in shape and positioned spatially along the longitudinal axis of the transparent substrate thereby facilitating determination of angular orientation in one dimension.

The orientation dependent reflector, as discussed above, is alternatively provided such that the plurality of retro reflecting patches positioned on the back surface of the transparent substrate are arranged to form a two-dimensional grid and the plurality of openings in the opaque film layer are arranged to form a two-dimensional pattern on the front surface of the transparent substrate. By incorporating a two-dimensional pattern in the plurality of openings so to cooperate with the two-dimensional grid of retro reflecting patches, the alternate embodiment of the orientation dependent reflector is capable of facilitating the determination of angular orientation of an object in two dimensions.

Most importantly, however, the embodiments of the orientation dependent reflectors utilize retro reflecting material for producing reflections. This aspect provides the orientation dependent reflectors with the ability to gather and reflect adequate amounts of light to facilitate the detection of the centroid of reflection from remote positions. Thus, the orientation dependent reflectors of the present invention facilitate being used in systems using standard light sources and simple light sensors that are capable of detection in only one dimension.

An important feature of the present invention is that the orientation dependent reflector, when used in conjunction with additional light reflectors, can facilitate the determination of the angular orientation of an object in three dimensions.

Another important feature of the present invention is that the orientation dependent reflector is capable of gathering and reflecting light in adequate amounts so to facilitate the centroid of reflection being detected by a light sensor located at a remote position.

Another important feature of the present invention is that the orientation dependent reflector can be utilized in conjunction with a light sensor that is capable of detection in only one dimension.

Another important feature of the present invention is that the orientation dependent reflector is inexpensive and simple to manufacture thereby readily facilitating the commercialization thereof.

The foregoing has outlined rather broadly, the more pertinent and important features of the present invention. The detailed description of the invention that follows is offered so the present contribution to the art can be more fully appreciated. Additional features of the invention will be described hereinafter. These form the subject of the claims of the invention. It should be appreciated by those skilled in the art that the conception are the disclosed specific embodiment may be readily utilized as a basis for modifying or designing other structures for carrying out the same purposes of the present invention. It should also be realized by those skilled in that art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompanying drawings in which.

Similar reference characters refer to similar parts throughout the several views of the drawings.

DETAILED DESCRIPTION OF THE PREFERRED EMBODIMENT

In referring to FIGS. 1, 2, 3 and 4, the orientation dependent reflector 5 can be seen in various views. The orientation dependent reflector 5, can be seen to include a transparent substrate 10 having a front surface 12, a back surface 14 and opposing ends 16a and 16b. The transparent substrate 10 can further be seen to be elongated in shape having a longitudinal axis 18. The transparent substrate 10 is preferably formed from a material exhibiting transparent properties sufficient for facilitating an undistorted transmission of light therethrough. Further, the transparent substrate 10 is formed from a material exhibiting a hardness and smoothness suitable for depositing material thereon by way of standard thick film processes commonly used in industry. Alternatively, the transparent substrate 10 may be textured so as to exhibit retro reflecting properties (not shown) or smooth enough to readily accept adhesive sheet portions from a large sheet of retro reflecting material (not shown).

The transparent substrate 10 can be seen to include a retro reflection means, generally indicated by reference numeral 20, coupled to the back surface 14. The retro reflection means 20 can be seen to be comprised of a plurality of retro reflecting patches 22 of which are parallel aligned and rectangular in shape. The plurality of retro reflecting patches 22 can further be seen to be positioned spatially along and perpendicular to the longitudinal axis 18 of the transparent substrate 10. The plurality of retro reflecting patches 22 are preferably formed from a material exhibiting retro reflecting properties (the property of reflecting light predominantly back to the source). The retro reflecting material used herein is in the form of retro reflecting particles suspended in a spreadable mixture which is readily adherable to the back surface 14 of the transparent substrate 10. It is to be noted that the retro reflecting material may alternatively be in various other forms available in the industry.

Coupled to the front surface 12 of the transparent substrate 10 is an opaque means, generally indicated by reference numeral 24. The opaque means 24 can be seen to be comprised of an opaque film layer 26 having a plurality of openings 28 therein. The plurality of openings 28 are to facilitate allowing light to pass through the transparent substrate 10 so to reflect off of the plurality of retro reflecting patches 22 positioned on the back surface 14. It can further be seen that the plurality of openings 28 are in the form of parallel slits aligned perpendicular to and spatially along the longitudinal axis 18 of the transparent substrate 10. The plurality of openings 28 are aligned in a laterally spaced offset nature relative to the plurality of retro reflecting patches 22 such that light passing through the plurality of openings 28 and reflecting off the plurality of reflecting patches 22 will produce a reflection having a detectable centroid that varies in position in correspondence to the angular orientation of an object.

The angular orientation is subsequently determined by locating the centroid of reflection on the orientation dependent reflector 5. The centroid of reflection will vary in position along the longitudinal axis 18 in correspondence to a specific angular orientation due to light being reflected back at a specific angle. Depending upon the incident angle of arrival of the light on the orientation dependent reflector 5, only specific retro reflecting patches 22 will be exposed thereby producing a centroid of reflection. Hence, this centroid of reflection will correspond to a specific angular orientation. Thus, by detecting the centroid of reflection and, hence, its respective position along the longitudinal axis 18, the angular orientation can be determined.

Figure 1:
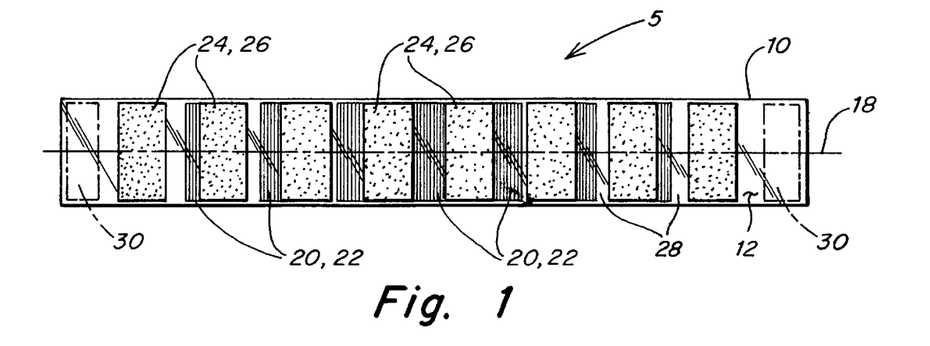
FIG. 1 is a top plan view of the orientation dependent reflector illustrating the transparent substrate having a front surface, the plurality of openings and the plurality of retro reflecting patches in their relative positions to each other.
Figure 2:
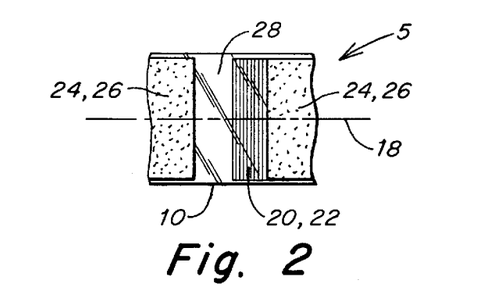
FIG. 2 is a partial enlarged top plan view of the orientation dependent reflector illustrating the relative alignment of the opaque film layer, the plurality of openings, the plurality of retro reflecting patches and the transparent substrate in their relative positions to each other.
Figure 3:
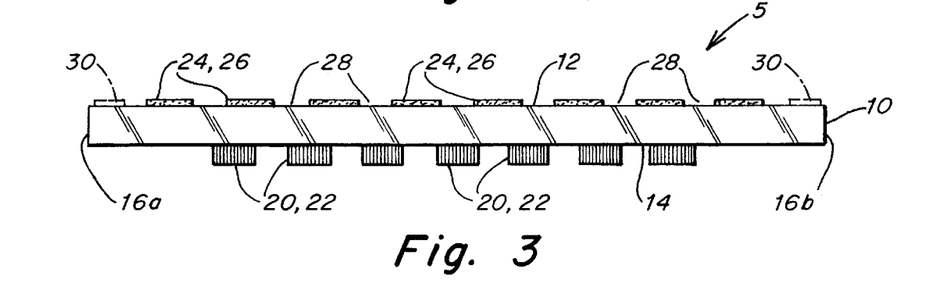
FIG. 3 is a side elevational view of the orientation dependent reflector illustrating the opaque film layer, the transparent substrate, the plurality of retro reflecting patches and the reference patches shown in their relative positions to each other.
Figure 4:
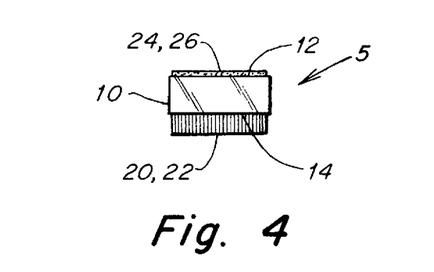
FIG. 4 is an end elevational view of the orientation dependent reflector illustrating the opaque film layer, the transparent substrate and the plurality of retro reflecting patches in their relative positions to each other.

Additionally, as can be seen specifically in FIGS. 1 and 3, the orientation dependent reflector 5 may further include an orientation independent reflection means, generally indicated by reference numeral 30 (shown in phantom), positioned adjacent the opposing ends 16a and 16b of the transparent substrate 10. The orientation independent reflection means 30 can be seen to be in the form of reference patches of rectangular shape. The reference patches serve to provide a reflection that is independent of angular orientation and, hence, will never vary in its position. It is preferable that the orientation independent reflection means 30 be formed from retro reflecting material in the form of retro reflecting particles suspended in a spreadable mixture readily adherable to the transparent substrate 10. Alternatively, the orientation independent reflection means may be in the form of a front surface 12 or back surface 14 that is textured so as to exhibit retro reflecting properties (not shown).

Figure 5A:
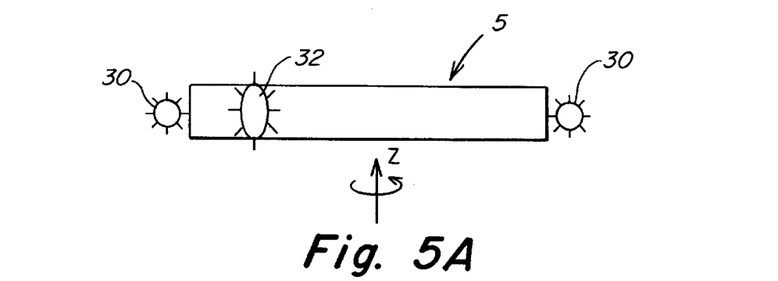
FIG. 5A is a graphical representation of the orientation dependent reflector illustrating the centroid of reflection detected in correspondence to an angular orientation produced by rotating the object counterclockwise about the Z-axis.
Figure 5B:
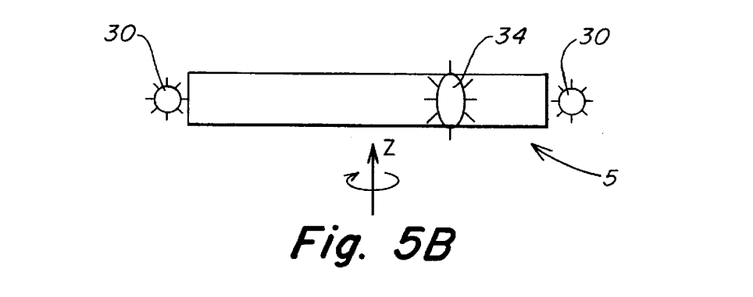
FIG. 5B is a graphical representation of the orientation dependent reflector illustrating the centroid of reflection detected in correspondence to an angular orientation produced by rotating the object clockwise about the Z-axis.
Figure 5C:
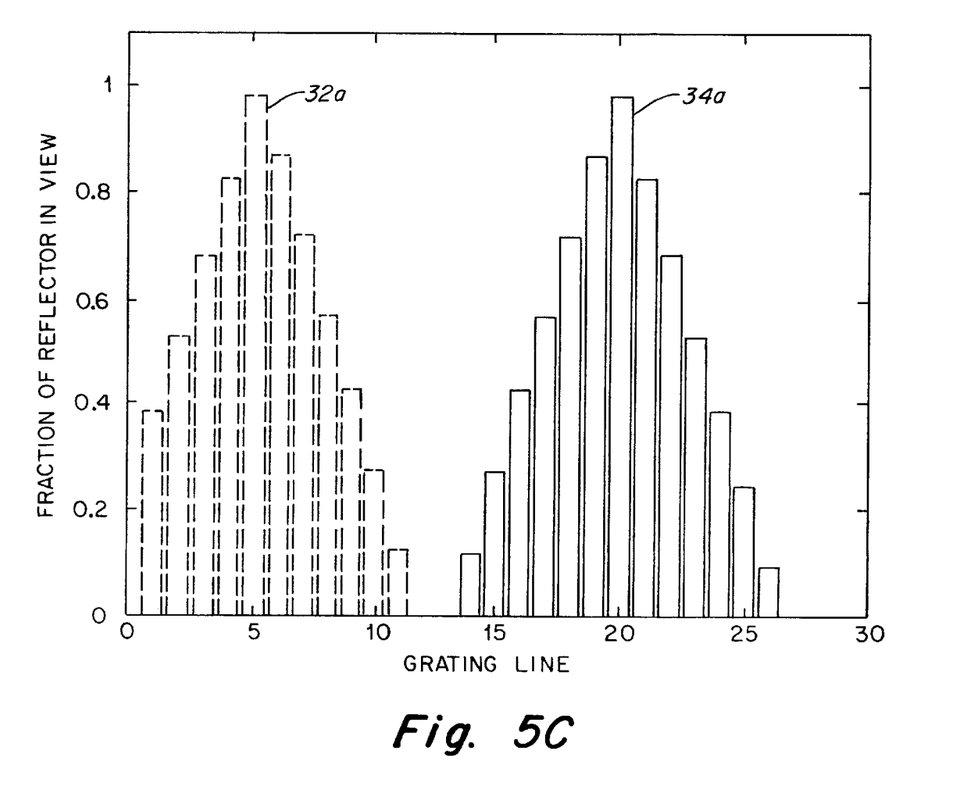
FIG. 5C is graphical representations of the centroids of reflection detected on the orientation dependent reflector corresponding to the respective angular orientations produced in FIGS. 5A and 5B.

In referring now to FIGS. 5A, 5B and 5C, graphical representations can be seen illustrating the varying position of the centroids of reflection along the longitudinal axis 18 of the orientation dependent reflector S in correspondence to rotations about the Z axis. FIG. 5A is illustrative of the position of a centroid of reflection 32 detected on the orientation dependent reflector 5 when rotated counterclockwise about the Z-axis. The orientation independent reflection means 30 can be seen to produce individual reflections at the opposing ends 16a and 16b of the orientation dependent reflector 5. Likewise, when rotated clockwise about the Z-axis, a centroid of reflection 34 can be seen along the longitudinal axis 18 in correspondence to the changed angular orientation.

In referring to FIG. 5C, graphical representations of the centroids of reflection 32 and 34 can be seen as formed by the plurality of retro reflecting patches 22 that are exposed due to specific angular orientations. The orientation corresponding to FIG. 5A is depicted by the reflection group having a centroid of reflection 32a located near grating line 5 (shown in phantom). Likewise, the orientation corresponding to FIG. 5B is depicted by the reflection group having a centroid of reflection 34a located near grating line 20. In both reflection groups it can be seen that the fraction of exposure of the plurality of retro reflecting patches 22 decreases gradually as you travel away from the centroids 32a and 34a along the longitudinal axis 18 of the orientation dependent reflector 5. Thus, only specific retro reflecting patches 22 will be exposed and, hence, reflecting light in correspondence to a specific angular orientation.

An example of a preferred construction of the orientation dependent reflector 5 is dimensionally described as follows:

Length: 1 (cm)

Width: 0.5 (cm)

Transparent substrate thickness: 280 ($\mu$m)

Number of openings: 30

Opening spacing: 330 ($\mu$m)

Reflecting patch spacing: 325 ($\mu$m)

Retro reflecting patch width: 33 ($\mu$m)

Orientation for viewing first retro reflecting patch: +15°

Orientation for viewing last retro reflecting patch: −15°

Angle range over which some part of a retro reflecting patch is visible: +/−6.8°

Sensitivity: 330 ($\mu$m/deg)

Percent area exposed through openings: 10%

Total number of retro reflecting patches visible at one time: 11

Effective number of retro reflecting patches reflecting: 6.4

Effective orientation dependent reflector area: 1.06 (sq mm)

Figure 6A:
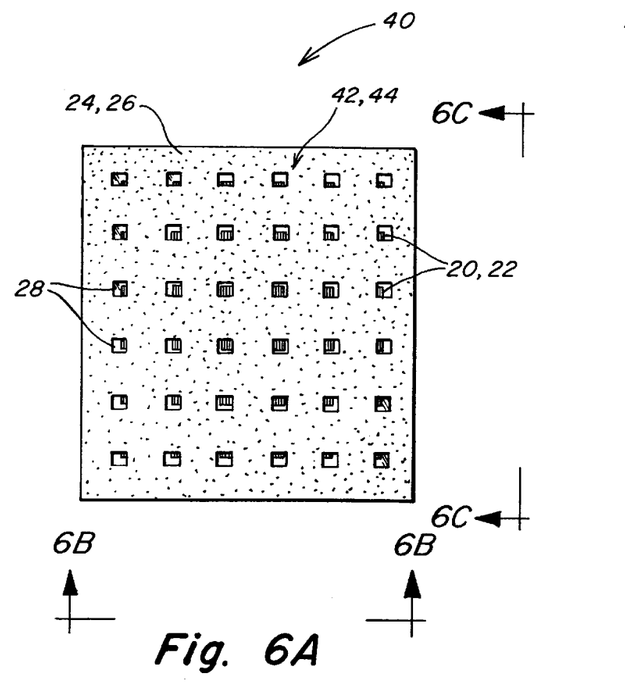
FIG. 6A is a top plan view of an alternate embodiment of the orientation dependent reflector illustrating the opaque film layer having a plurality of openings and the plurality of retro reflecting patches exposed therethrough.
Figure 6B:
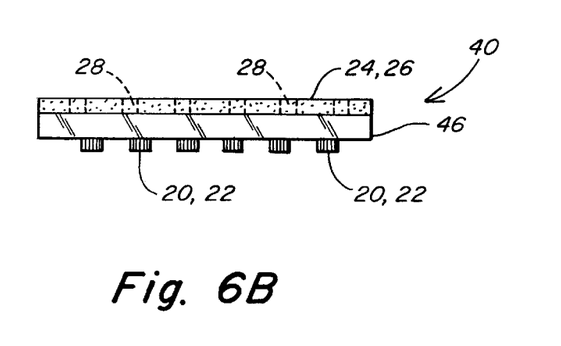
FIG. 6B is a side elevational view of the alternate embodiment of the orientation dependent reflector taken along line B—B illustrating the opaque film layer having a plurality of openings, the transparent substrate and the plurality of retro reflecting patches in their relative positions to each other.
Figure 6C:
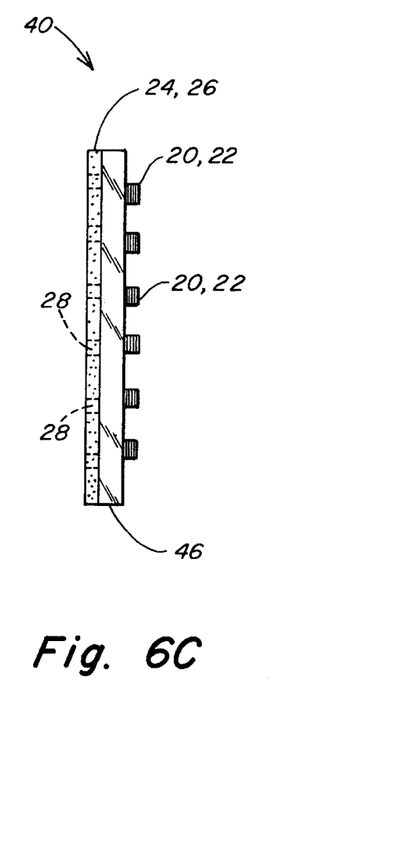
FIG. 6C is another side elevational view of the alternate embodiment of the orientation dependent reflector taken along line C—C illustrating the opaque film layer having a plurality of openings, the transparent substrate and the plurality of retro reflecting patches in their relative positions to each other.

In referring to FIGS. 6A, 6B and 6C, an alternate embodiment of the orientation dependent reflector, generally indicated by reference numeral 40 can be seen. Orientation dependent reflector 40 facilitates the instantaneous determination of angular orientation in two dimensions. The orientation dependent reflector 40 is seen to be similarly formed as previously described above in the first embodiment. In the orientation dependent reflector 40, the plurality of openings 28 in the opaque film layer 26 can be seen to be in the form of a two-dimensional pattern 42. Similarly, the plurality of retro reflecting patches 22 can be seen to be in the form of a two-dimensional grid 44. It can be further seen that the two-dimensional pattern 42 of the plurality of openings 28 are designed to cooperate with the two-dimensional grid 44 of the plurality of retro reflecting patches 22 such that exposure thereof co-varies with a specific angular orientation. It is also emphasized that for a specific angular orientation, a centroid of reflection can be determined that corresponds to specific angular orientations in two dimensions. The offset nature of the plurality of openings 28 relative to the plurality of retro reflecting patches 22 is further evident in FIGS. 6B and 6C. Further, the orientation dependent reflector 40 can be seen to have a square-shaped transparent substrate 46.

Figure 7A:
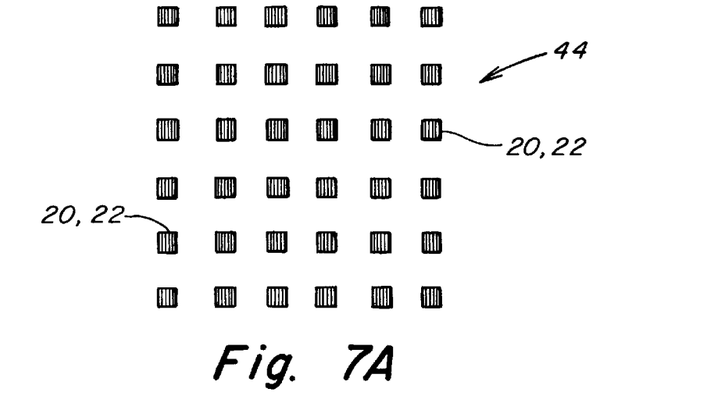
FIG. 7A is a graphical representation of the plurality of retro reflecting patches arranged in a two-dimensional grid.
Figure 7B:
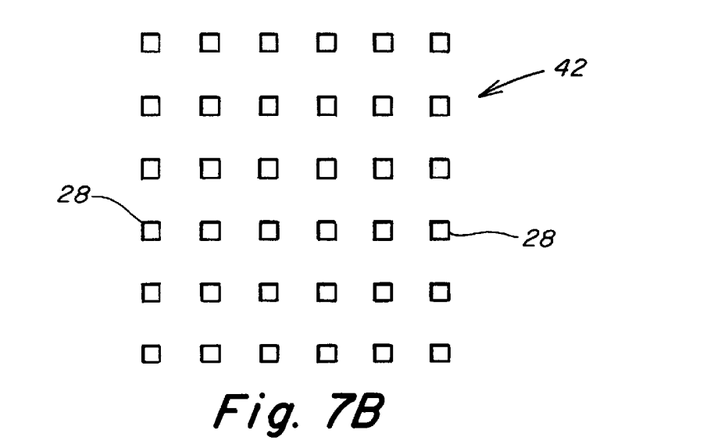
FIG. 7B is a graphical representation of the plurality of openings in the opaque film layer illustrating the two-dimensional pattern formed therein.
Figure 7C:
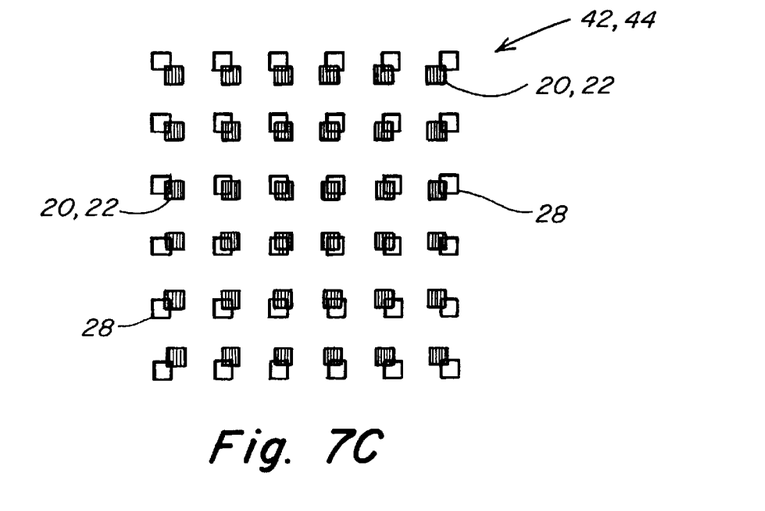
FIG. 7C is a graphical representation illustrating the typical alignment of the two-dimensional grid of the plurality of retro reflecting patches with the two-dimensional pattern of the plurality of openings in the opaque film layer.

In referring now to FIGS. 7A, 7B and 7C, the two-dimensional grid 44 and two-dimensional pattern 42 of the respective plurality of retro reflecting patches 22 and plurality of openings 28 are better illustrated. FIG. 7C serves to clarify the laterally-spaced offset nature of the plurality of openings 28 relative to the plurality of retro reflecting patches 22. The orientation dependent reflector 40 is preferably formed from similar materials as described previously in the first embodiment.

Figure 8:
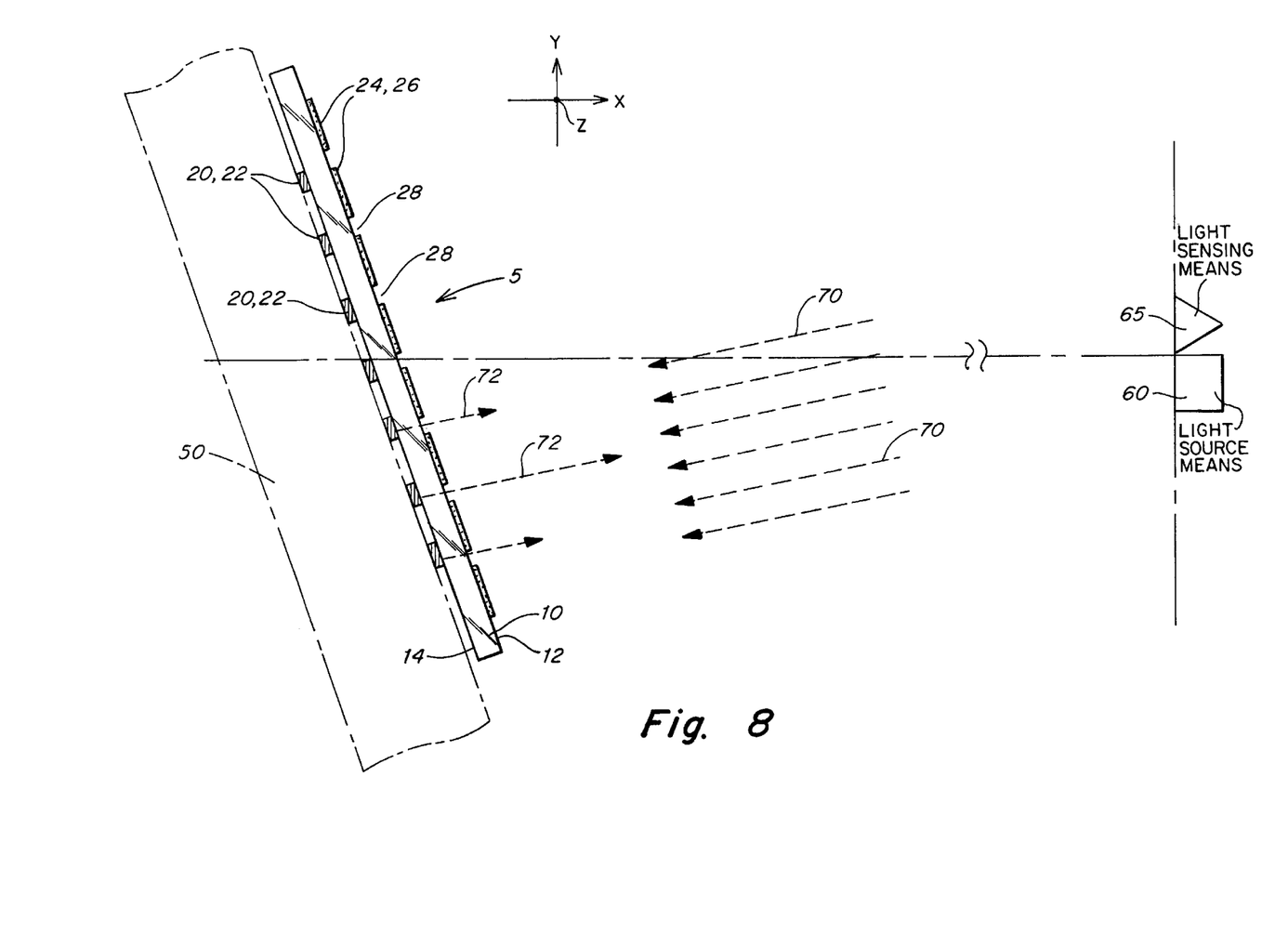
FIG. 8 is a graphical representation of the orientation dependent reflector in position on an object while in use within a system that further includes a light source and a light sensor in their relative positions to each other.

In referring now to FIG. 8, the orientation dependent reflector 5 can be seen coupled to an object 50 and in use with a system further comprised of a light source means, generally indicated by reference numeral 60, and a light sensing means, generally indicated by reference numeral 65. The light source means 60 is preferably in the form of a light source capable of producing a detectable beam of light. Any standard light source commonly used for optical sensing in the industry would be suitable. The light sensing means 65 is preferably in the form of a light sensor commonly used in the optical sensing industry of which can determine the centroid of reflection on the orientation dependent reflector 5. A standard light sensor capable of one-dimensional detection of the direction of light arrival is suitable for use herein.

It can be further seen that the light source means 60 and the light sensing means 65 are positioned adjacent one another at a distance away from the orientation dependent reflector 5. The detectable beam of light incident on the orientation dependent reflector 5 can be seen to be represented by arrows 70 and the resultantly reflected light is represented generally by reference numeral 72. It can be seen that, as the orientation dependent reflector 5 rotates about the Z-axis, only specific retro reflecting patches 22 are exposed to the incident detectable beam of light 70 and, hence, reflect back the detectable beam of light, generally indicated by reference numeral 72, parallel to the angle of arrival. Thus, a specific position is determined for the centroid of reflection which corresponds to the angular orientation of the object 50.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An orientation dependent reflector comprising:

a transparent substrate having a front surface and a back surface;

a retro reflective pattern coupled to the back surface, to return incident light in a direction parallel to the incident light; and an opaque filter coupled to the front surface to prevent light from passing through the transparent substrate, the opaque filter including a plurality of openings offset relative to the retro reflective pattern, to provide a reflection having a detectable centroid that varies in position across the front surface, based on a rotation of the substrate about at least one axis of rotation.

2. The orientation dependent reflector as recited in claim 1, wherein the retro reflective pattern includes a plurality of retro reflecting patches.

3. The orientation dependent reflector as recited in claim 1, wherein the opaque filter includes an opaque film layer.

4. The orientation dependent reflector as recited in claim 2, wherein the transparent substrate is elongated in shape, having a longitudinal axis.

5. The orientation dependent reflector as recited in claim 4, wherein the plurality of openings includes a plurality of parallel slits aligned perpendicular to and spatially along the longitudinal axis; and the retro reflecting patches are parallel aligned, rectangular in shape, and positioned spatially along and perpendicular to the longitudinal axis.

6. The orientation dependent reflector as recited in claim 5, wherein each of the retro reflecting patches is formed from a retro reflecting material.

7. The orientation dependent reflector as recited in claim 2, wherein the plurality of retro reflecting patches is arranged to form a two-dimensional grid.

8. The orientation dependent reflector as recited in claim 7, wherein the plurality of openings is arranged to form a two-dimensional pattern.

9. The orientation dependent reflector as recited in claim 8, wherein each of the retro reflecting patches is formed from a retro reflecting material.

10. The orientation dependent reflector as recited in claim 9, wherein each of the retro reflecting patches forms a square shape.

11. The orientation dependent reflector as recited in claim 5, wherein the transparent substrate further includes an orientation independent reflector coupled relative to the transparent substrate to reflect light independent of the rotation.

12. The orientation dependent reflector as recited in claim 11, wherein the orientation independent reflector includes at least one reference patch formed from retro reflecting material.

13. An optical system comprising:
    an orientation dependent reflector including:
        a transparent substrate having a front surface and a back surface;
        a retro reflective pattern coupled to the back surface to return incident light in a direction parallel to the incident light; and
        an opaque filter coupled to the front surface to prevent light from passing through the transparent substrate, the opaque filter including a plurality of openings offset relative to the retro reflective pattern, to provide a reflection having a centroid that varies in position across the front surface, based on a rotation of the substrate about at least one axis of rotation;
    a light source to project an optically detectable beam of light towards the orientation dependent reflector; and
    a light sensor to detect the centroid from the orientation dependent reflector.

14. The system as recited in claim 13, wherein the retro reflective pattern includes a plurality of retro reflecting patches.

15. The system as recited in claim 13, wherein the opaque filter includes an opaque film layer.

16. The system as recited in claim 14, wherein the transparent substrate is elongated in shape, having a longitudinal axis.

17. The system as recited in claim 16, wherein:
    the plurality of openings includes a plurality of parallel slits aligned perpendicular to and spatially along the longitudinal axis; and
    the retro reflecting patches are parallel aligned, rectangular in shape, and positioned spatially along and perpendicular to the longitudinal axis.

18. The system as recited in claim 14, wherein the plurality of retro reflecting patches is arranged to form a two-dimensional grid.

19. The system as recited in claim 18, wherein the plurality of openings is arranged to form a two-dimensional pattern.

20. The system as recited in claim 19, wherein each of the retro reflecting patches is formed from a retro reflecting material.

21. The system as recited in claim 20, wherein each of the retro reflecting patches forms a square shape.

22. The system as recited in claim 17, wherein the transparent substrate further includes an orientation independent reflector coupled relative to the transparent substrate to reflect light independent of the rotation.

23. The system as recited in claim 22, wherein the orientation independent reflector includes at least one reference patch formed from retro reflecting material.

24. The system as recited in claim 13, wherein the light sensor is positioned adjacent to the light source.

25. The system as recited in claim 13, wherein the orientation dependent reflector is attached to an object.

26. The orientation dependent reflector as recited in claim 1, wherein at least one of the front surface and the back surface is textured so as to exhibit retro reflection properties.

27. The orientation dependent reflector as recited in claim 1, wherein the retro reflective pattern includes a sheet of retro reflecting material adhesively coupled to the back surface.

28. The orientation dependent reflector as recited in claim 6, wherein the retro reflecting material includes retro reflecting particles suspended in a spreadable mixture that is readily adhered to the back surface.

29. A method for providing an orientation dependent reflection, comprising a step of:
    varying an amount of light to which a retro reflective pattern is exposed, in response to a rotation of the retro reflective pattern about at least one axis of rotation, to provide the orientation dependent reflection having a detectable centroid, wherein the detectable centroid has a position that varies across the retro reflective pattern corresponding to the rotation.

30. The method of claim 29, wherein the step of varying an amount of light includes a step of filtering the light.

31. The method of claim 30, wherein the step of filtering includes a step of passing the light through a plurality of openings in an opaque filter.

32. The method of claim 31, wherein the step of varying an amount of light includes a step of coupling the retro reflective pattern to the opaque filter, such that the plurality of openings is offset relative to the retro reflective pattern.

33. The method of claim 32, wherein the retro reflective pattern includes a plurality of retro reflecting patches.

34. An orientation dependent reflector, comprising:
    first retro reflecting means; and
    means for providing an orientation dependent reflection from the first retro reflecting means, wherein:
        the orientation dependent reflection has a detectable centroid; and
        the detectable centroid has a position that varies across the orientation dependent reflector corresponding to a rotation of the orientation dependent reflector about at least one axis of rotation.

35. The orientation dependent reflector of claim 34, wherein the means for providing an orientation dependent reflection includes means for varying an amount of light to which the first retro reflecting means is exposed in response to the rotation.

36. The orientation dependent reflector of claim 34, further comprising second retro reflecting means for reflecting the light source independent of the rotation.

37. The orientation dependent reflector of claim 35, wherein the means for varying an amount of light includes means for filtering the light.

38. The orientation dependent reflector of claim 37, wherein the means for filtering includes an opaque filter having a plurality of openings.

39. The orientation dependent reflector of claim 38, wherein the means for varying an amount of light includes means for coupling the first retro reflecting means to the opaque filter such that the plurality of openings is offset relative to the first retro reflecting means.

40. The orientation dependent reflector of claim 39, wherein the first retro reflecting means includes a plurality of reflecting patches.

* * * * *